(12) United States Patent
Martinez et al.

(10) Patent No.: US 12,477,976 B1
(45) Date of Patent: Nov. 25, 2025

(54) STEERING ARM RETURN TO NEUTRAL MECHANISM

(71) Applicant: Deere & Company, Moline, IL (US)

(72) Inventors: Josean J. Martinez, Raleigh, NC (US); Mark C. Jonak, Cary, NC (US)

(73) Assignee: DEERE & COMPANY, Moline, IL (US)

( * ) Notice: Subject to any disclaimer, the term of this patent is extended or adjusted under 35 U.S.C. 154(b) by 1 day.

(21) Appl. No.: 18/330,079

(22) Filed: Jun. 6, 2023

(51) Int. Cl.
*A01D 34/00* (2006.01)
*B62D 1/12* (2006.01)

(52) U.S. Cl.
CPC ............. *A01D 34/006* (2013.01); *B62D 1/12* (2013.01)

(58) Field of Classification Search
CPC .. A01D 34/006; A01D 34/824; F16H 61/439; B62D 1/12
See application file for complete search history.

(56) References Cited

U.S. PATENT DOCUMENTS

| | | | |
|---|---|---|---|
| 5,127,215 A | 7/1992 | Wenzel | |
| 5,542,307 A | 8/1996 | Hasegawa et al. | |
| 6,122,996 A | 9/2000 | Hauser | |
| 6,487,857 B1 | 12/2002 | Poplawski et al. | |
| 6,640,526 B2 * | 11/2003 | Velke | B62D 11/183 56/10.8 |
| 6,715,284 B1 | 4/2004 | Poplawski et al. | |
| 7,111,545 B1 | 9/2006 | Langenfeld | |
| 7,134,276 B1 | 11/2006 | Langenfeld et al. | |
| 7,234,385 B2 | 6/2007 | Dong et al. | |
| 7,451,865 B2 * | 11/2008 | Eavenson, Sr. | B62D 11/006 56/11.3 |
| 7,458,311 B2 | 12/2008 | Korthals | |
| 7,634,953 B2 | 12/2009 | Hoffman et al. | |
| 7,647,754 B2 | 1/2010 | Velke et al. | |
| 7,677,371 B2 * | 3/2010 | Dong | F16D 49/16 303/3 |
| 7,908,960 B2 | 3/2011 | Daigre | |
| 8,087,481 B2 | 1/2012 | Trefz et al. | |
| 8,235,151 B2 | 8/2012 | Nunez et al. | |
| 8,240,420 B1 * | 8/2012 | Bartel | B62D 11/006 180/315 |
| 9,141,126 B2 | 9/2015 | Hynes et al. | |
| 9,341,258 B1 | 5/2016 | Templin | |
| 9,538,706 B2 * | 1/2017 | Haun | B62D 5/064 |
| 10,414,436 B1 | 9/2019 | Bonny | |

(Continued)

FOREIGN PATENT DOCUMENTS

WO    WO 2023191870 A1    10/2023

OTHER PUBLICATIONS

Great Britain Combined Search and Examination Report issued in application No. GB2404928.0 dated Aug. 30, 2024, 06 pages.

*Primary Examiner* — Karen Beck

(57) ABSTRACT

A steering arm return to neutral mechanism for a steering arm pivotable on a shaft between a forward drive position and a reverse drive position. A torsion spring around the shaft has a first leg providing a spring force against a pin extending from the steering arm to pivot the steering arm from the forward drive position back to a neutral position, and a second leg providing a spring force against the pin to pivot the steering arm from the reverse drive position back to the neutral position. A stationary plate is positioned between the first leg and the second leg of the torsion spring.

3 Claims, 4 Drawing Sheets

(56) References Cited

U.S. PATENT DOCUMENTS

| | | | |
|---|---|---|---|
| 10,724,632 B1 * | 7/2020 | Thompson | G05G 1/01 |
| 10,822,021 B2 | 11/2020 | Hauser et al. | |
| 10,836,426 B1 * | 11/2020 | Busboom | B62D 11/04 |
| 10,981,589 B1 | 4/2021 | Bartel et al. | |
| 2002/0178709 A1 * | 12/2002 | Velke | A01D 34/82 |
| | | | 56/10.9 |
| 2006/0172857 A1 * | 8/2006 | Eavenson | B62D 11/006 |
| | | | 477/203 |
| 2007/0125054 A1 * | 6/2007 | Dong | F16D 49/16 |
| | | | 56/11.3 |
| 2016/0302356 A1 * | 10/2016 | Haun | B62D 11/24 |

* cited by examiner

STEERING ARM RETURN TO NEUTRAL MECHANISM

FIELD OF THE INVENTION

This invention relates to grass mowing machines, and specifically to zero turning radius ("ZTR") mowers having independently powered left and right drive wheels controlled by a pair of steering arms or control levers.

BACKGROUND OF THE INVENTION

Grass mowing machines known as zero turning radius (ZTR) mowers have at least one independently powered traction drive wheel on each side of a frame. Many ZTR mowers have a twin stick control system. A pair of steering arms or control levers are side-by-side, with each steering arm controlling one of the drive wheels. When both steering arms are advanced together forwardly out of their neutral position, both drive wheels rotate forwardly to cause the mower to move forward. A ZTR mower may be steered by advancing one steering arm more than the other. When a steering arm is in neutral, between forward and reverse, the operator may pivot it outwardly on a second pivot axis.

Typically, ZTR mowers have steering arms that are mechanically linked to hydrostatic transmissions that rotate the drive wheels. Additionally, ZTR mowers have steering arm return to neutral mechanisms connected to the swashplate control arms of the hydrostatic transmission. Steering arm return to neutral mechanisms have included coil springs urging the swashplate control arms from forward or reverse back to the neutral position.

Some ZTR mowers have steering arms that command electric motors to rotate the traction drive wheels, instead of hydrostatic transmissions. For example, the steering arms may provide position signals to rotary sensors or potentiometers.

There is a need for a steering arm return to neutral mechanism for ZTR mowers with electric traction drive. There is a need for a steering arm return to neutral mechanism that overcomes friction and losses of the system. There is a need for a steering arm return to neutral mechanism that provides consistent return to neutral forces from either direction. There is a need for a steering arm return to neutral mechanism that is low cost and few parts. There is a need for a steering arm return to neutral mechanism that is within the steering bracket or housing.

SUMMARY OF THE INVENTION

A steering arm return to neutral mechanism includes a torsion spring coiled around a pivot axis of a steering arm. A pivoting pin extends laterally outward from a lower end of the steering arm. Optionally, a bushing may be rotatably mounted to the pin. The torsion spring has a pair of legs, one of the legs being contacted and moved by the pivoting pin and/or bushing, and the other leg contacting a stationary plate, to increase load of the torsion spring and urge the pivoting pin and the lower end of the steering arm to a neutral drive position.

DESCRIPTION OF THE PREFERRED EMBODIMENT

Figure 1:
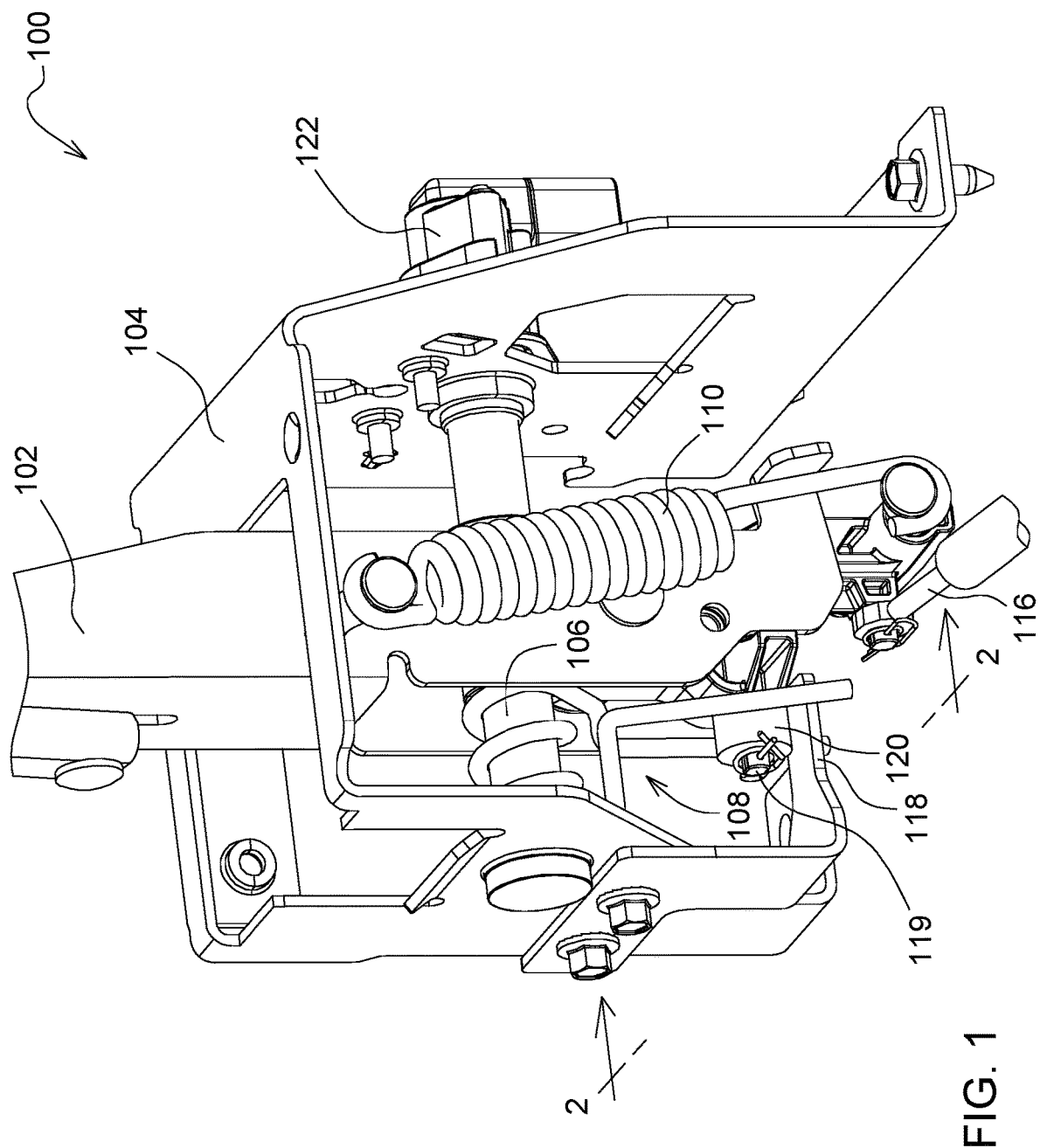
FIG. 1 is a perspective view of a ZTR mower with a steering arm return to neutral mechanism according to a first embodiment of the invention.

In a first embodiment shown in FIGS. 1-4, steering arm return to neutral mechanism 100 may provide force urging steering arm 102 from forward or reverse to a neutral position. Steering arm 102 may be mounted to shaft 106 having an axis of rotation for pivoting between forward and reverse. Shaft 106 may have an inward end and an outward end. Each end of shaft 106 may be pivotably mounted to bracket or housing 104. Bracket or housing 104 may be adjacent the operator seat of a zero turning radius (ZTR) mower. Dampener or shock absorber 116 may be connected to the lower end of steering arm 102 to help smooth motion of the steering arm. Steering arm 102 also may pivot on a second perpendicular axis between the neutral position and an outward position to engage a park brake. Coil spring 110 may bias the steering arm to or from the outward position. For example, each steering arm 102 may be mounted as described in U.S. Pat. No. 9,510,503 for Grass Mowing Machine Operator Platform owned by Deere & Company, or a similar structure.

In a first embodiment shown in FIGS. 1-4, steering arm return to neutral mechanism 100 may include a single torsion spring 108 mounted around shaft 106. The mechanism may have the same pivot axis as steering arm 102. While steering arm 102 may be above the pivot axis of shaft 106, torsion spring 108 may be below the pivot axis of shaft 106. Torsion spring 108 may include coil 134 which may go around the portion of shaft 106 that extends laterally outward from steering arm 102. Torsion spring 108 also may have first leg 128 and second leg 130 extending downwardly from coil 134. For example, the angle between the first leg and second leg may be less than about 18 degrees when the steering arm is in the neutral drive position. Torsion spring 108 may be pre-loaded at the neutral position, so both legs are biased against pivoting pin 119, or against bushing 120 which may be rotatably mounted on the pin axis. The operator must overcome this pre-loaded spring force to pivot the steering arm from neutral to a forward or reverse drive position. Torsion spring 108 may provide an increasing spring force as the angle of the steering arm increases, urging steering lever 102 from forward or reverse back toward a neutral position.

In one embodiment shown in FIGS. 1-4, steering arm return to neutral mechanism 100 may include rotary sensor 122 that detects the forward or reverse position of steering arm 102. For example, rotary sensor 122 may be a potentiometer. Position signals from rotary sensor 122 may be translated or mapped to speed commands of a traction drive motor for a rear drive wheel. Alternatively, steering arm 102 may be connected by a mechanical linkage to a swash plate on a hydrostatic transmission to rotate a rear drive wheel.

In one embodiment shown in FIGS. 1-4, steering arm return to neutral mechanism 100 may include pivoting pin 119 and stationary plate 118 which are used together to load torsion spring 108. Torsion spring 108 may be pre-loaded in the neutral position, and increasingly loaded when the operator pivots steering lever 102 in forward or reverse. Torsion spring 108 provides a spring force that increases as the steering arm is rotated further in both forward and reverse directions, causing steering arm 102 to return to neutral when it is released. Bushing 120 may be rotatably mounted on pivoting pin 119.

In one embodiment shown in FIGS. 1-4, steering arm return to neutral mechanism 100 may include pivoting pin 119 and optionally, bushing 120, which pivots or rotates with steering arm 102, and stationary plate 118 attached to bracket or housing 104. Alternatively, stationary plate may be integral to the bracket or housing. The pin and optional bushing may move further away from the stationary plate during travel of the steering arm. Pivoting pin 119 may be attached to or extend laterally outwardly from steering arm 102, below shaft 106 and steering axis 132. The first leg 128 of torsion spring 108 may be forward of pivoting pin 119 and stationary plate 118, and second leg 130 may be rearward of pivoting pin 119 and stationary plate 118.

Figure 2:
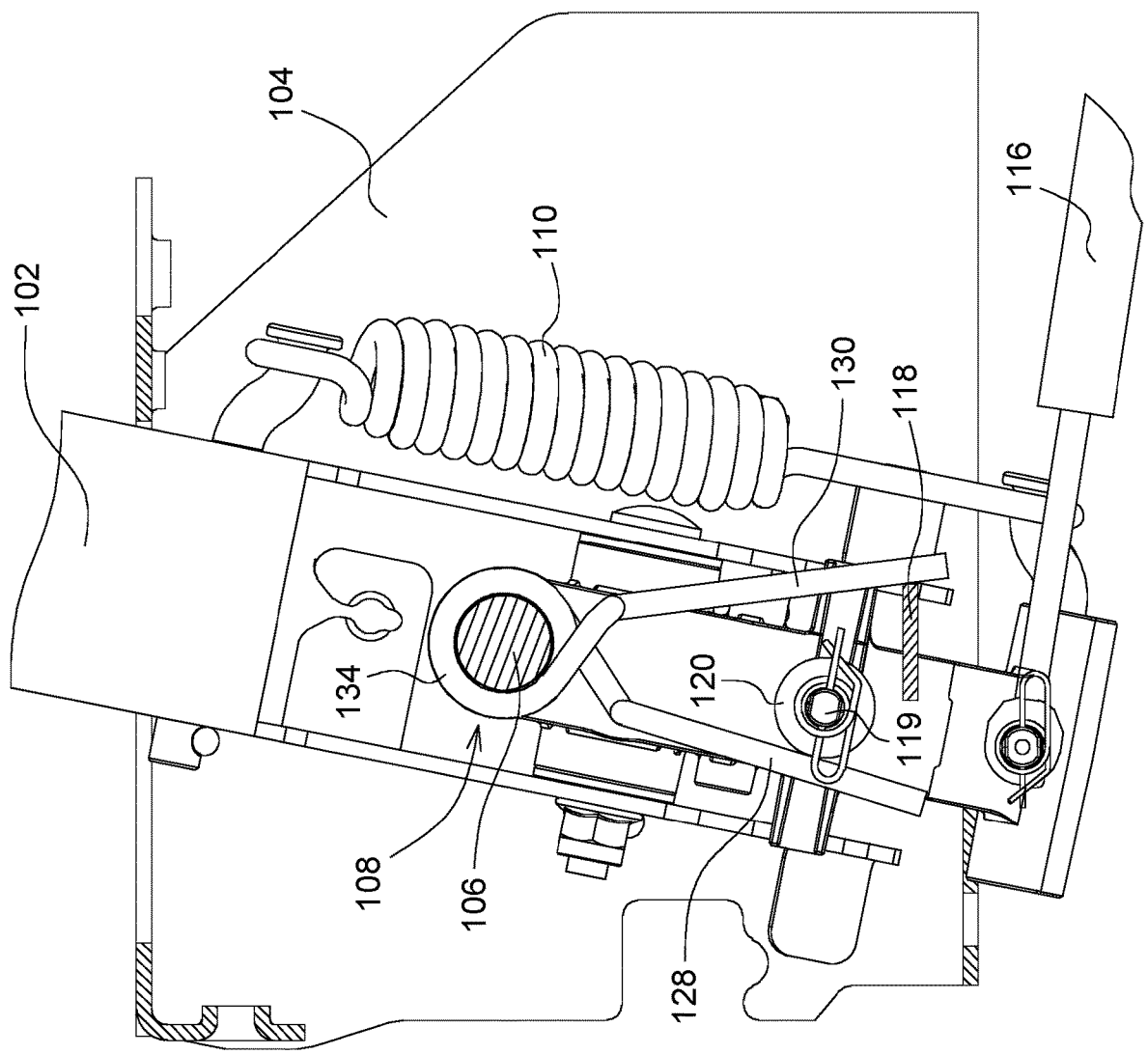
FIG. 2 is a rear perspective view of a steering arm return to neutral mechanism with the steering arm in a forward drive position according to a first embodiment of the invention.

FIG. 2 shows an embodiment of steering arm 100 return to neutral mechanism 100 with steering arm 102 pivoted in the forward drive position. Pivoting pin 119 and/or bushing 120 contacts and pushes second leg 130 rearward to increase the load and force of torsion spring 108, while stationary plate 118 abuts first leg 128. The increased force of torsion spring 108 against pivoting pin 119 and/or bushing 120 urges steering arm 102 from a forward position toward neutral.

Figure 3:
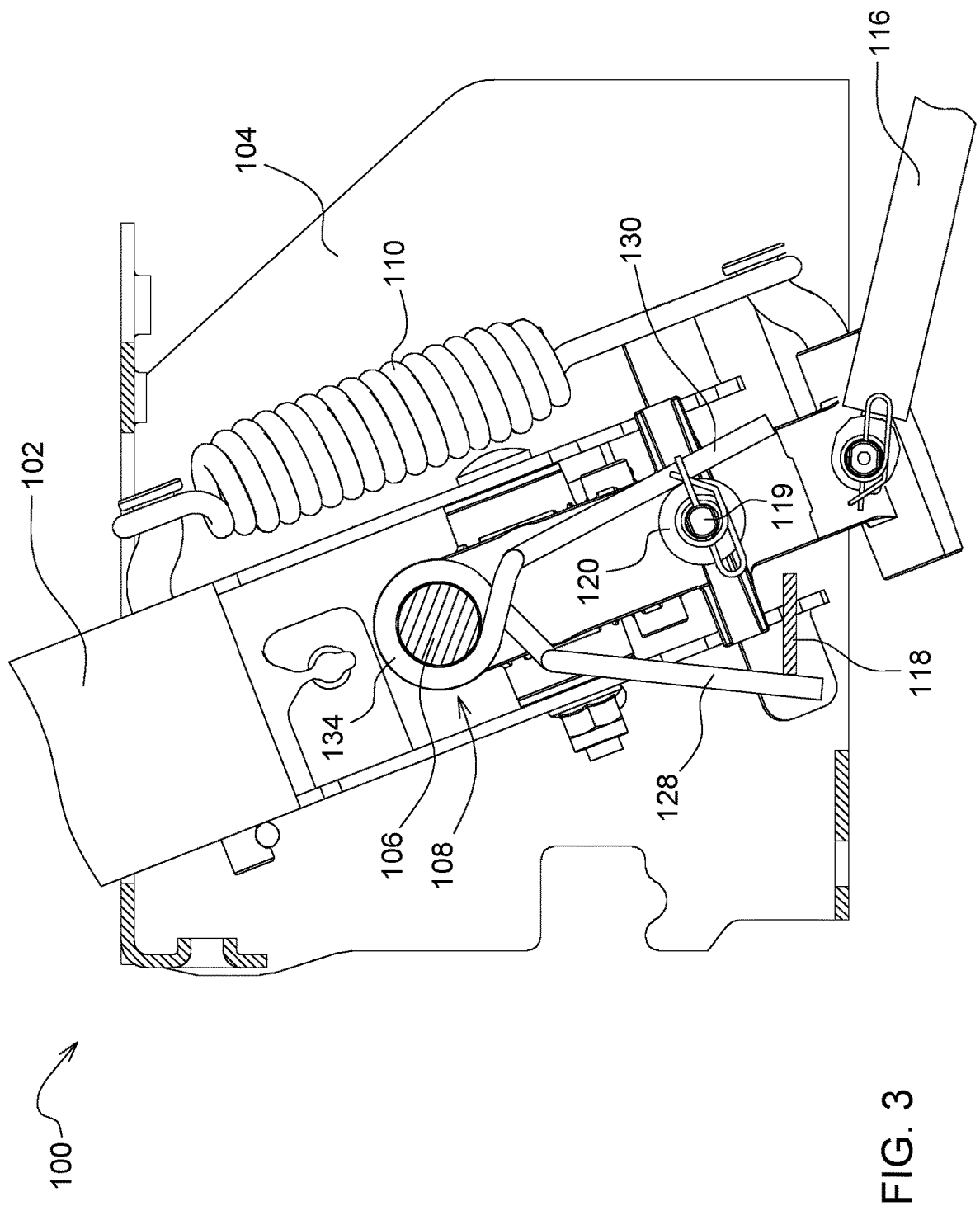
FIG. 3 is a rear perspective view of a steering arm return to neutral mechanism with the steering arm in a reverse drive position according to a first embodiment of the invention.

FIG. 3 shows an embodiment of steering arm return to neutral mechanism 100 with steering arm 102 pivoted in a reverse drive position. Pivoting pin 119 and/or bushing 120 contacts and pushes first leg 128 forward to increase the load and force of torsion spring 108, while stationary plate 118 abuts second leg 130. The force of torsion spring 108 against pivoting pin 119 and/or bushing 120 urges steering arm 102 from a reverse position toward neutral.

Figure 4:
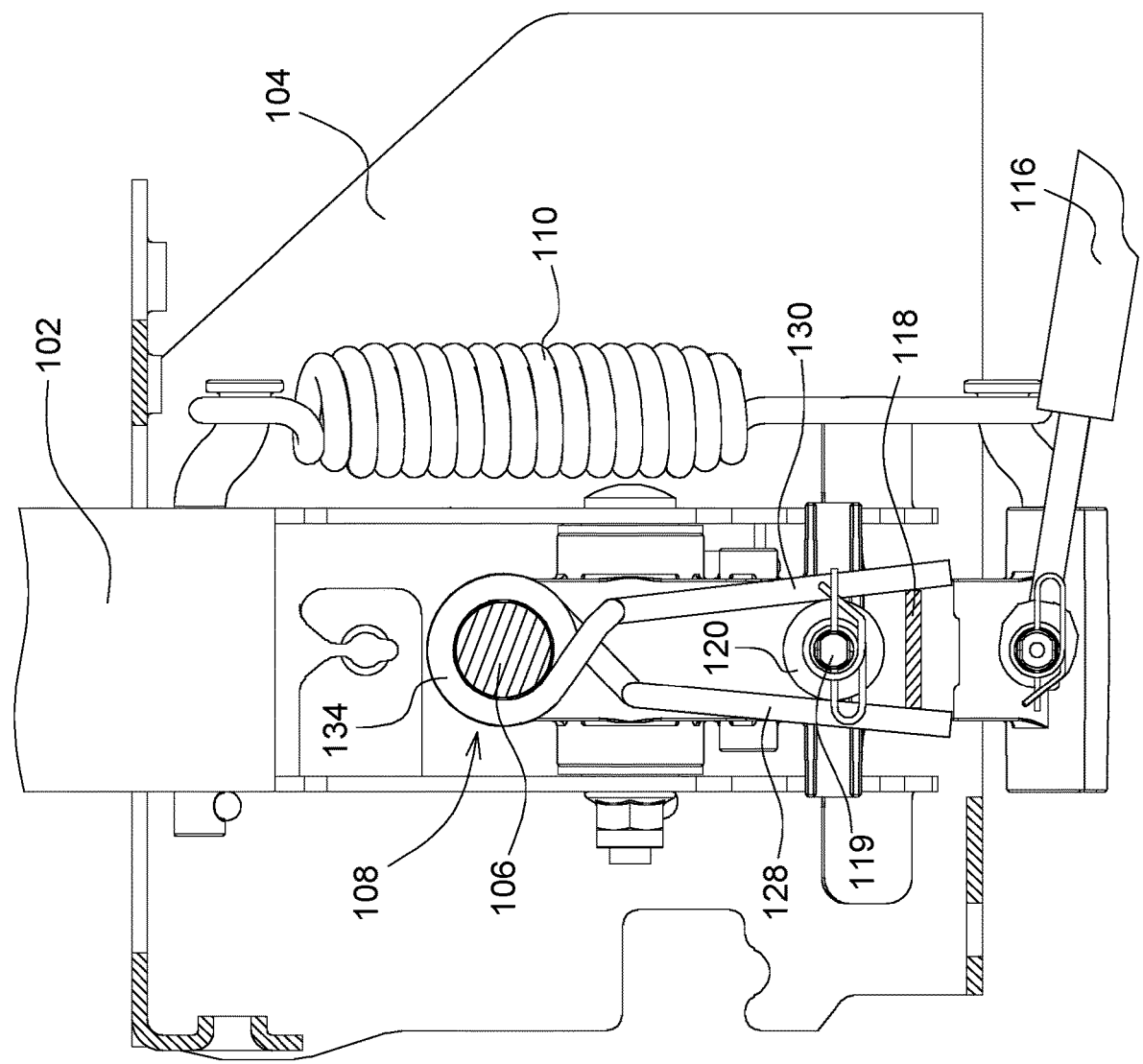
FIG. 4 is a rear perspective view of a steering arm return to neutral mechanism with the steering arm in a neutral position according to a first embodiment of the invention.

FIG. 4 shows an embodiment of steering arm return to neutral mechanism 100 with steering arm 102 in neutral, so that pivoting pin 119 and/or bushing 120 are between first leg 128 and second leg 130, while stationary plate 118 abuts both the first and second legs.

In one embodiment shown in FIGS. 1-4, steering arm return to neutral mechanism 100 may be contained inside bracket or housing 104, and may be connected directly to the steering arm system. The mechanism provides consistent returns in either direction, and the force of torsion spring 108 is sufficient to overcome the friction and losses of the steering arm system.

Having described the preferred embodiments, it will become apparent that various modifications can be made without departing from the scope of the invention as defined in the accompanying claims.

The invention claimed is:

1. A steering arm return to neutral mechanism, comprising:
   a steering arm pivotable between a forward drive position and a reverse drive position;
   a torsion spring providing a spring force pushing the steering arm from a forward drive position and a reverse drive position toward a neutral position;
   the torsion spring having a coil, a first leg and a second leg;
   a pivoting pin and a stationary plate between the pair of legs of the torsion spring, the pivoting pin extending laterally outward from a lower end of the steering arm and contacting and moving the first and second legs to load the torsion spring; and
   a bushing rotatably mounted on the pivoting pin.

2. The steering arm return to neutral mechanism of claim 1, wherein the torsion spring coil is around a shaft on which the steering arm pivots to the forward drive position and the reverse drive position.

3. The steering arm return to neutral mechanism of claim 1 wherein the first and second legs of the torsion spring extend downwardly from the coil.

* * * * *